US012686752B2

(12) United States Patent
Timken et al.

(10) Patent No.: US 12,686,752 B2
(45) Date of Patent: Jul. 21, 2026

(54) PROCESS FOR STABLE BLEND OF WASTE PLASTIC WITH PETROLEUM FEED FOR FEEDING TO OIL REFINERY UNITS AND PROCESS OF PREPARING SAME

(71) Applicant: Chevron U.S.A. Inc., San Ramon, CA (US)

(72) Inventors: Hye-Kyung C. Timken, Albany, CA (US); Tengfei Liu, San Ramon, CA (US); Joel E. Schmidt, San Ramon, CA (US); Kaustav Chaudhuri, San Ramon, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 687 days.

(21) Appl. No.: 18/128,444

(22) Filed: Mar. 30, 2023

(65) Prior Publication Data

US 2023/0312863 A1      Oct. 5, 2023

Related U.S. Application Data

(60) Provisional application No. 63/326,722, filed on Apr. 1, 2022.

(51) Int. Cl.
C08J 11/20 (2006.01)

(52) U.S. Cl.
CPC ............ C08J 11/20 (2013.01); *C08J 2323/06* (2013.01); *C08J 2323/12* (2013.01)

(58) Field of Classification Search
USPC ........................................................ 521/47
See application file for complete search history.

(56) References Cited

U.S. PATENT DOCUMENTS

| | | | |
|---|---|---|---|
| 3,845,157 A | 10/1974 | Woo | |
| 3,852,207 A | 12/1974 | Stangeland | |
| 4,642,401 A | 2/1987 | Coenen et al. | |
| 5,849,964 A | 12/1998 | Holighaus et al. | |
| 6,143,940 A | 11/2000 | Miller et al. | |
| 6,150,577 A * | 11/2000 | Miller | C10G 1/10 |
| | | | 585/734 |
| 6,288,296 B1 | 9/2001 | Miller et al. | |
| 6,676,828 B1 | 1/2004 | Galiasso | |
| 6,774,272 B2 | 8/2004 | Miller | |
| 6,822,126 B2 | 11/2004 | Miller | |
| 7,834,226 B2 | 11/2010 | Miller | |
| 7,867,381 B2 | 1/2011 | Koseoglu | |
| 8,088,961 B2 | 1/2012 | Miller | |
| 8,404,912 B1 | 3/2013 | Miller | |
| 8,696,994 B2 | 4/2014 | Miller | |
| 2013/0267745 A1 | 10/2013 | Schrod et al. | |
| 2014/0228205 A1 | 8/2014 | Narayanaswamy et al. | |
| 2015/0258713 A1 | 9/2015 | Valdmaa et al. | |
| 2016/0264885 A1 | 9/2016 | Narayanaswamy et al. | |
| 2016/0362609 A1 * | 12/2016 | Ward | C10G 69/02 |
| 2018/0201847 A1 | 7/2018 | Kohli et al. | |
| 2019/0023997 A1 | 1/2019 | Sundaram | |
| 2019/0161683 A1 * | 5/2019 | Narayanaswamy ... | C10G 69/14 |
| 2020/0172716 A1 | 6/2020 | Pehlert et al. | |
| 2021/0087473 A1 | 3/2021 | Pradeep et al. | |
| 2021/0130699 A1 | 5/2021 | Bitting et al. | |
| 2021/0189248 A1 | 6/2021 | Timken | |
| 2021/0189249 A1 | 6/2021 | Timken | |
| 2021/0189250 A1 | 6/2021 | Timken | |
| 2021/0189252 A1 | 6/2021 | Timken | |
| 2021/0189254 A1 | 6/2021 | Timken | |
| 2021/0332299 A1 | 10/2021 | Timken | |
| 2021/0332300 A1 | 10/2021 | Timken | |
| 2022/0041940 A1 | 2/2022 | Pradeep et al. | |
| 2022/0098490 A1 | 3/2022 | Abbott et al. | |
| 2022/0267685 A1 | 8/2022 | Babu et al. | |
| 2022/0314497 A1 | 10/2022 | Ramanujam et al. | |

FOREIGN PATENT DOCUMENTS

| | | |
|---|---|---|
| DE | 43 29 436 C1 | 3/1995 |
| EP | 0 620 264 A2 | 10/1994 |
| EP | 1 707 614 A1 | 4/2006 |
| EP | 3878926 A1 | 11/2021 |
| WO | 2005/061673 A1 | 7/2005 |
| WO | 2013/169367 A1 | 11/2013 |
| WO | 2016/059565 A2 | 4/2016 |
| WO | 2022/020151 A1 | 1/2022 |

OTHER PUBLICATIONS

International Preliminary Report on Patentability issued in related International Patent Application No. PCT/US2023/016869, Sep. 24, 2024.
International Search Report and Written Opinion issued in related International Patent Application No. PCT/US2023/016853, Jul. 11, 2023.
International Preliminary Report on Patentability issued in related International Patent Application No. PCT/US2023/016853, Sep. 24, 2024.
International Search Report and Written Opinion issued in related International Patent Application No. PCT/US2023/016833, Jun. 30, 2023.
International Preliminary Report on Patentability issued in related International Patent Application No. PCT/US2023/016833, Sep. 24, 2024.

(Continued)

*Primary Examiner* — Terressa Boykin
(74) *Attorney, Agent, or Firm* — E. Joseph Gess; Melissa M. Hayworth; Terrence M. Flaherty

(57) ABSTRACT

Provided is a blend of a petroleum feedstock and 1-20 wt. % of plastic, based on the weight of the blend, with the plastic comprising polyethylene and/or polypropylene, and the plastic in the blend comprising finely dispersed microcrystalline particles having an average particle size of 10 micron to less than 100 microns. A process for preparing a blend of plastic and petroleum is provided, comprising mixing together a petroleum feed and a plastic comprising polyethylene and/or polypropylene and heating the mixture above the melting point of the plastic, but less than 500° F. Then cooling the plastic melt and petroleum feedstock liquid blend with mixing to a temperature below the melting point of the plastic.

22 Claims, 10 Drawing Sheets

(56) References Cited

OTHER PUBLICATIONS

International Search Report and Written Opinion issued in related International Patent Application No. PCT/US2023/016839, Jul. 5, 2023.

International Preliminary Report on Patentability issued in related International Patent Application No. PCT/US2023/016839, Sep. 24, 2024.

International Search Report and Written Opinion issued in related International Patent Application No. PCT/US2023/016850, Jul. 3, 2023.

International Preliminary Report on Patentability issued in corresponding International Patent Application No. PCT/US2023/016850, Sep. 24, 2024.

International Search Report and Written Opinion issued in related International Patent Application No. PCT/US2023/016857, Jul. 20, 2023.

International Preliminary Report on Patentability issued in related International Patent Application No. PCT/US2023/016857, Sep. 24, 2024.

International Search Report and Written Opinion issued in related International Patent Application No. PCT/US2023/016862, Jul. 11, 2023.

International Preliminary Report on Patentability issued in related International Patent Application No. PCT/US2023/016862, Sep. 24, 2024.

International Search Report and Written Opinion issued in related International Patent Application No. PCT/US2023/069864, Nov. 14, 2023.

International Search Report and Written Opinion issued in related International Patent Application No. PCT/US2023/069871, Nov. 14, 2023.

International Search Report and Written Opinion issued in related International Patent Application No. PCT/US2023/069874, Nov. 16, 2023.

International Search Report and Written Opinion issued in related International Patent Application No. PCT/US2023/069862, Jan. 18, 2024.

International Search Report and Written Opinion issued in related International Patent Application No. PCT/US2023/069876, Nov. 16, 2023.

International Search Report and Written Opinion issued in related International Patent Application No. PCT/US2023/069881, Nov. 16, 2023.

International Search Report and Written Opinion issued in International Patent Application No. PCT/US2023/016869, Jul. 20, 2023.

Extended European Search Report issued in corresponding European Patent Application No. 23781799.4, Mar. 9, 2026.

Rodríguez Elena et al: "Co-cracking of high-density polyethylene (HDPE) and vacuum gasoil (VGO) under refinery conditions", Chemical Engeneering Journal, Elsevier, Amsterdam, NL, vol. 382, 24, Aug. 2019.

Odjo Andrew O. et al: "Conversion of low density polyethylene into fuel through co-processing with vacuum gas oil in a fluid catalytic cracking riser reactor", Fuel Processing Technology, vol. 113, Sep. 1, 2013, pp. 130-140.

* cited by examiner

Figure 4

Cross polarized light

Bright field light

PROCESS FOR STABLE BLEND OF WASTE PLASTIC WITH PETROLEUM FEED FOR FEEDING TO OIL REFINERY UNITS AND PROCESS OF PREPARING SAME

CROSS REFERENCE TO RELATED APPLICATIONS

The present application claims priority to U.S. Provisional Application No. 63/326,722, filed Apr. 1, 2022, the complete disclosure of which is incorporated herein by reference in its entirety.

BACKGROUND

The world has seen extremely rapid growth of plastics production. According to PlasticEurope Market Research Group, the world's plastics production was 335 million tons in 2016, 348 million tons in 2017 and 359 million tons in 2018. According to McKinsey & Company, the global plastics-waste volume was estimated about 260 million tons per year in 2016 and projected to be 460 million tons per year by 2030 if the current trajectory continues.

Single use plastic waste has become an increasingly important environmental issue. At the moment, there appear to be few options for recycling polyethylene and polypropylene waste plastics to value-added chemicals and fuel products. Currently, only a small amount of polyethylene/polypropylene is recycled via chemical recycling, where recycled and cleaned plastic pellets are pyrolyzed in a pyrolysis unit to make fuels (naphtha, diesel), steam cracker feed or slack wax. The majority, greater than 80%, is incinerated, land filled or discarded.

The current method of chemical recycling via pyrolysis cannot make a big impact for the plastics industry. The current pyrolysis operation produces poor quality fuel components (naphtha and diesel range products), but the quantity is small enough that these products can be blended into fuel supplies. However, this simple blending cannot continue if we have to recycle very large volumes of waste polyethylene and polypropylene to address the environmental issues. The products as produced from the pyrolysis unit have too poor quality to be blended in large amounts (for example 5-20 volume % blending) in transportation fuels.

Processes are known which convert waste plastic into hydrocarbon lubricants. For example, U.S. Pat. No. 3,845,157 discloses cracking of waste or virgin polyolefins to form gaseous products such as ethylene/olefin copolymers which are further processed to produce synthetic hydrocarbon lubricants. U.S. Pat. No. 4,642,401 discloses the production of liquid hydrocarbons by heating pulverized polyolefin waste at temperatures of 150-500° C. and pressures of 20-300 bars. U.S. Pat. No. 5,849,964 discloses a process in which waste plastic materials are depolymerized into a volatile phase and a liquid phase. The volatile phase is separated into a gaseous phase and a condensate. The liquid phase, the condensate and the gaseous phase are refined into liquid fuel components using standard refining techniques. U.S. Pat. No. 6,143,940 discloses a procedure for converting waste plastics into heavy wax compositions. U.S. Pat. No. 6,150,577 discloses a process of converting waste plastics into lubricating oils. EP0620264 discloses a process for producing lubricating oils from waste or virgin polyolefins by thermally cracking the waste in a fluidized bed to form a waxy product, optionally using a hydrotreatment, then catalytically isomerizing and fractionating to recover a lubricating oil.

U.S. Pub. No. 2021/0130699 discloses processes and systems for making recycle content hydrocarbons from recycled waste material. The recycle waste material is pyrolyzed to form a pyrolysis oil composition, at least a portion of which may then be cracked to form a recycle olefin composition.

Other documents which relate to processes for converting waste plastic into lubricating oils include U.S. Pat. Nos. 6,288,296; 6,774,272; 6,822,126; 7,834,226; 8,088,961; 8,404,912 and 8,696,994; and U.S. Patent Application Publication Nos. 2019/0161683; 2016/0362609; and 2016/0264885. The foregoing patent documents are incorporated herein by reference in their entirety.

Globally, recycling or upcycling of plastic waste has gained great interest to save resources and the environment. Mechanical recycling of plastic waste is rather limited due to different types, properties, additives, and contaminants in the collected plastics. Usually, the recycled plastics are of degraded quality. Chemical recycling to the starting material or value-added chemicals has emerged as a more desirous route.

However, in order to achieve chemical recycling of single use plastics in an industrially significant quantity to reduce its environmental impact, more robust processes are needed. Such a process may require unique handing and manipulation of the waste plastic.

SUMMARY

In one embodiment, provided is a composition of a stable blend of a waste plastic and a petroleum based feedstock for direct conversion of waste plastic in a refinery process unit.

The stable blend comprises a petroleum based feedstock and 1-20 weight % of plastic. The plastic, in one embodiment, is comprised of mostly polyethylene and/or polypropylene. The plastic in the blend is present as finely dispersed microcrystalline particles having an average particle size of 10 micron to less than 100 microns, preferentially less than 80 microns.

Also provided in one embodiment is a process for preparing a blend of plastic and petroleum. The process comprises mixing a petroleum based feed and a plastic together, and heating the mixture above the melting point of the plastic, but not greater than 500° F. With continued mixing the plastic melt and petroleum feedstock liquid blend is cooled to a temperature below the melting point of the plastic.

Among other factors, the present process prepares a stable blend of plastic and a petroleum based feedstock. This blend of plastic and petroleum based feedstock provides a vehicle to efficiently and effectively feed waste plastic to refinery processes for conversion of the waste plastic to high volume products, with good yields. It has been found that by preparing the present blend and feeding the blend to refinery operations, one can efficiently and effectively recycle plastic waste while also complementing the operation of a refinery in the preparation of higher value products such as gasoline, jet fuel, base oil, and diesel fuel. Polyethylene and polypropylene can also be produced from the waste plastics efficiently and effectively. In fact, positive economics are realized for the overall recycling process with product quality identical to that of virgin polymer. The use of the present blend also saves energy and is more environmentally friendly than prior recycling processes.

BRIEF DESCRIPTION OF THE DRAWINGS

FIG. 4 depicts the plastic type classification for waste plastics recycling.

DETAILED DESCRIPTION

Figure 1:
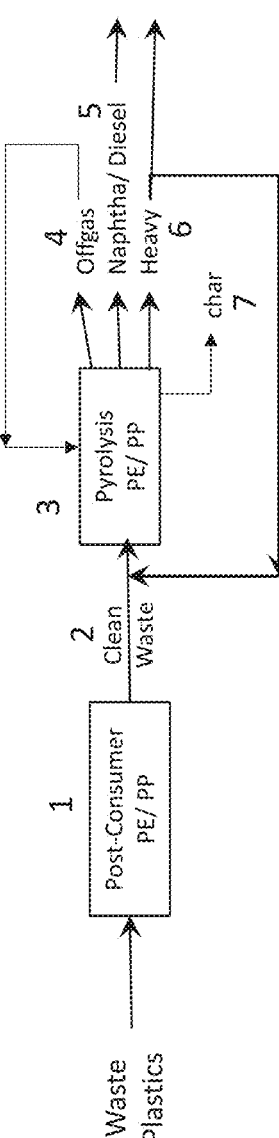
FIG. 1 depicts the current practice of pyrolyzing waste plastics to produce fuel or wax (base case).

Disclosed are a novel plastic and petroleum based feedstock blend, and a process to prepare a stable blend of a plastic and a petroleum based feedstock for direct conversion of plastic in a refinery process unit.

In one embodiment, provided is a process for preparing a stable blend of plastic, preferably waste plastic, and petroleum for storage, transportation or feeding to a refinery unit. The process comprises first selecting plastics, preferably waste plastics, containing polyethylene and/or polypropylene. These waste plastics are then passed through a blend preparation unit to make a stable blend of waste plastic and petroleum. The stable blend is fed to a refinery conversion unit for direct conversion of waste plastic to value-added chemicals and fuels.

The stable blend is made by a two-step process. The first step produces a hot, homogeneous liquid blend of plastic melt and petroleum feedstock. The preferred range of the plastic composition in the blend is about 1-20 wt. %. The preferred conditions for the hot liquid blend preparation include heating of plastic above the melting point of the plastic while vigorously mixing with petroleum feedstock. The preferred process conditions include heating to a 250-500° F. temperature, a residence time of 5-240 minutes at the final heating temperature, and 0-10 psig atmospheric pressure. This can be done in the open atmosphere as well as preferably under an oxygen-free inert atmosphere.

In the second step, the hot blend is cooled down below the melting point of the plastic while continuously, vigorously mixing, and then further cooling down to a lower temperature, preferably an ambient temperature, to produce a stable blend. The stable blend is either an oily liquid or in a waxy solid state at the ambient temperature depending on the petroleum feedstock.

In one embodiment, the stable blend is made of the petroleum feedstock and 1-20 wt. % of waste plastic, wherein the plastic is in the form of finely dispersed micron-size particles with 10 micron to less than 100-microns average particle size.

There are several advantages realized by the present blend and its use. For example, the stable blend of plastic and petroleum feedstock can be stored at ambient temperature and pressure for extended time periods. During the storage, no agglomeration, no settling of polymer particles and no chemical/physical degradation of the blend are observed. This allows easier handling of the waste plastic material for storage or transportation.

The stable blend can be handled easily by using standard pumps as are typically used in refineries or warehouses, or by using pumps equipped with transportation tanks. Depending on the blend, some heating of the blend above its pour point is required to pump the blend for transfer or for feeding to a conversion unit in a refinery. During the heating, no agglomeration of polymer is observed.

For feeding to a refinery unit, the stable blend is further heated above the melting point of the plastic to produce a homogeneous liquid blend of petroleum and plastic. The hot homogeneous liquid blend is fed directly to the oil refinery process units for conversion of waste plastics to high value products with good yields.

Refinery conversion units such as a fluid catalytic cracking (FCC) unit, hydrocracking unit, and hydrotreating unit, convert the hot homogeneous liquid blend of the plastic and petroleum feedstock in the presence of catalysts with simultaneous conversion of the plastic and petroleum feedstock. The presence of catalysts in the conversion unit allows conversion of the waste plastics to higher value products at a lower operating temperature than the typical pyrolysis temperature. The yields of undesirable byproducts (offgas, tars, coke) are lower than the typical pyrolysis process. For the hydroprocessing units (hydrocracking and hydrotreating units), hydrogen is added to units to improve the conversion of the plastics. The blend may generate additional synergistic benefits coming from the interaction of the plastic and petroleum feedstock during the conversion process. Fluid catalytic cracking and hydrocracking processes are preferred modes of catalytic conversion of the stable blend.

In one embodiment, the stable blend of plastic and petroleum feedstock can be sent to a coker unit for thermal conversion of waste plastics. In this case, there are no substantial advantages in the reactor temperature or the product yield compared to a pyrolysis process. The advantage of the coker unit is its feed flexibility in that the unit can handle a blend with very high nitrogen, sulfur, and metals impurities.

The stable blend of plastic and petroleum feedstock allows more efficient recycling of waste plastics. The use of the present blend is far more energy efficient than the current pyrolysis process, and allows recycling with a lower carbon footprint. The improved processes would allow establishment of a circular economy on a much larger scale by efficiently converting waste plastics back to virgin quality polymers or value-added chemicals and fuels.

Figure 2:
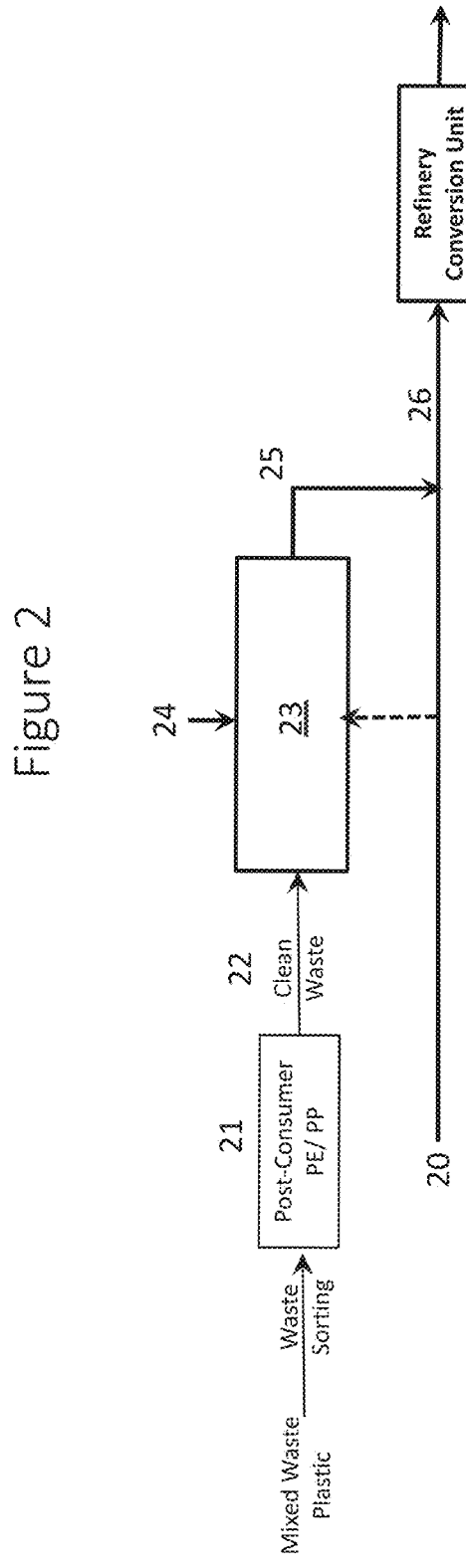
FIG. 2 depicts a present process of preparing a hot homogeneous liquid blend of plastic and petroleum feedstock and how the blend can be fed to a refinery conversion unit.
Figure 3:
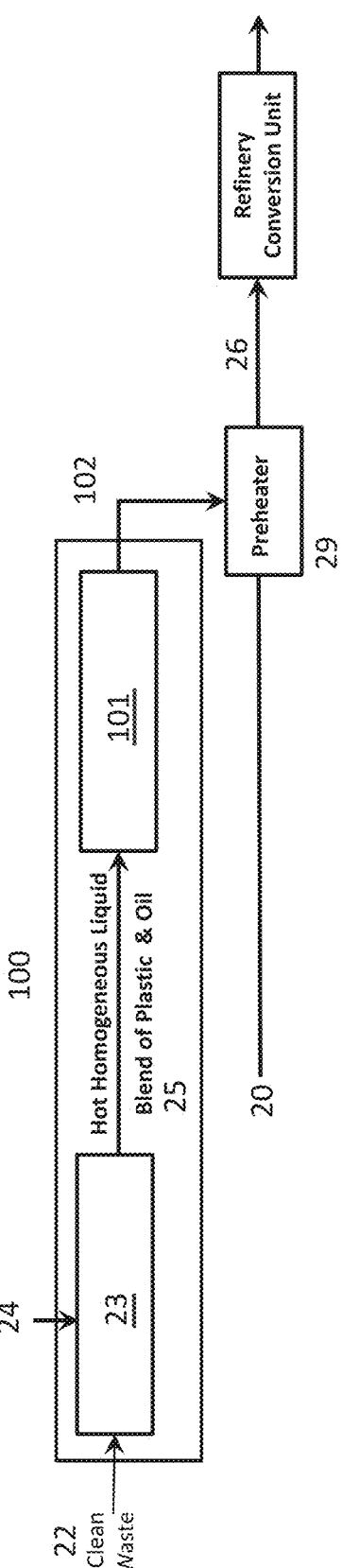
FIG. 3 depicts in detail the stable blend preparation process and how the stable blend can be fed to a refinery conversion unit.

A simplified process diagram for a base case of a waste plastics pyrolysis process is shown in FIG. 1. Preparation of a hot homogeneous liquid blend of plastic and petroleum feedstock is shown in FIG. 2. FIG. 3 depicts in detail the preparation of a stable blend of waste plastic and petroleum based feedstock. The figures depict the two process steps associated with the blend preparation.

As noted above, FIG. 1 shows a diagram of the pyrolysis of waste plastics fuel or wax that is generally operated in the industry today. Generally, the waste plastics are sorted together 1. The cleaned plastic waste 2 is converted in a pyrolysis unit 3 to offgas 4 and pyrolysis oil (liquid product). The offgas 4 from the pyrolysis unit 3 is used as fuel to operate the pyrolysis unit. An on-site distillation unit separates the pyrolysis oil to produce naphtha and diesel 5 products which are sold to fuel markets. The heavy pyrolysis oil fraction 6 is recycled back to the pyrolysis unit 3 to maximize the fuel yield. Char 7 is removed from the pyrolysis unit 3. The heavy fraction 6 is rich in long chain, linear hydrocarbons, and is very waxy (i.e., forms paraffinic wax upon cooling to ambient temperature). Wax can be separated from the heavy fraction 6 and sold to the wax markets.

Use of the present blend, however, avoids the pyrolysis of the waste plastic. Rather, a stable blend of petroleum feedstock and the waste plastic is prepared, which can be fed to the refinery units. Thus, the pyrolysis step can be avoided, which is a significant energy savings.

The present blend is prepared in a hot blend preparation unit where the operating temperature is above the melting point of the plastic (about 150-250° C.), to make a hot homogeneous liquid blend of plastic and oil. The hot homogeneous liquid blend of plastic and oil can be fed directly to the refinery units.

Alternatively, a blend is prepared in a stable blend preparation unit where the hot homogeneous liquid blend is cooled to ambient temperature in a controlled manner to allow for easy storage and transportation. By using this method, a stable blend can be prepared at a facility away from a refinery and can be transported to a refinery unit. Then the stable blend is heated above the melting point of the plastic to feed to the refinery conversion unit. The stable blend is a physical mixture of micron-size plastic particles finely suspended in the petroleum-based oil, with the average particle size of the plastic particles of 10 micron to less than 100 microns. The mixture is stable, and the plastic particles do not settle or agglomerate upon storage for extended period.

What is meant by heating the blend to a temperature above the melting point of the plastic is clear when a single plastic is used. However, if the waste plastic comprises more than one waste plastic, then the melting point of the plastic with the highest melting point is exceeded. Thus, the melting points of all plastics must be exceeded. Similarly, if the blend is cooled below the melting point of the plastic, the temperature must be cooled below the melting points of all plastics comprising the blend.

Compared with a pyrolysis unit, these blend preparation units operate at a much lower temperature (~500-600° C. vs. 120-250° C.). Thus, employing the present blend in conjunction with a refinery can provide a far more energy efficient process than a thermal cracking process such as pyrolysis.

The use of the present waste plastic/petroleum blend further increases the overall hydrocarbon yield obtained from the waste plastic. This increase in yield is significant. The hydrocarbon yield using the present blend offers a hydrocarbon yield that can be as much as 98%. To the contrary, pyrolysis produces a significant amount of light product from the plastic waste, about 10-30 wt. %, and about 5-10 wt. % of char. These light hydrocarbons are used as fuel to operate the pyrolysis plant, as mentioned above. Thus, the liquid hydrocarbon yield from the pyrolysis plant is at most 70-80%.

When the present blend is passed into the refinery units, such as a FCC unit, only a minor amount of offgas is produced. Refinery units use catalytic cracking processes that are different from the thermal cracking process used in pyrolysis. With catalytic processes, the production of undesirable light-end byproducts such as methane and ethane is minimized. Refinery units have efficient product fractionation and are able to utilize all hydrocarbon products streams efficiently to produce high value materials. Refinery cofeeding will produce only about 2% of offgas ($H_2$, methane, ethane, ethylene). The $C_3$ and $C_4$ streams are captured to produce useful products such as circular polymer and/or quality fuel products. Thus, the use of the present petroleum/plastic blend offers increased hydrocarbons from the plastic waste, as well as a more energy efficient recycling process compared to a thermal process such as pyrolysis. The benefits of the present blend are significant when considering recycling waste plastic.

In some cases, the conversion of waste plastic into clean fuels takes less energy than production of fuels from a virgin petroleum feedstock. As the collection and processing of waste plastic improves the gain in energy efficiencies will further improve. Such fuels produced from a blend of waste plastic and oil will have recycle contents and lower carbon footprints than corresponding fuels made from pure petroleum feedstock. The present process can produce clean gasoline, jet fuel and diesel with recycle contents and a lower $CO_2$ (lower carbon) footprint from waste plastic.

FIG. 2 illustrates a method for preparing a hot homogenous blend of plastic and petroleum feedstock which can be used for direct injection to a refinery unit. The preferred range of the plastic composition in the blend is about 1-20 wt. %. If high molecular weight polypropylene (average molecular weight of 250,000 or greater) waste plastic or high-density polyethylene (density above 0.93 g/cc) is used as the predominant waste plastic, e.g., at least 50 wt. %, then the amount of waste plastic used in the blend is more preferably about 10 wt. %. The reason being that the pour point and viscosity of the blend would be high. In one embodiment, the plastic can comprise polypropylene having an average molecular weight, $M_w$, in the range of 5,000 to 150,000. In another embodiment, the plastic can comprise polypropylene having an average molecular weight, $M_w$, in the range of 150,000 to 400,000.

The preferred conditions for the hot homogeneous liquid blend preparation include heating the plastic above the melting point of the plastic while vigorously mixing with a petroleum feedstock. The preferred process conditions include heating to a 250-500° F. temperature, with a residence time of 5-240 minutes at the final heating temperature, and 0-10 psig atmospheric pressure. This can be done in an open atmosphere as well as under an oxygen-free inert atmosphere.

The hot homogeneous blend of plastic melt and petroleum feedstock is prepared by mixing a petroleum feed and a plastic together and then heating the mixture above the melting point of the plastic, but not greater than 500° F., while thoroughly mixing. Alternatively, it is prepared by melting the plastic only and then adding the plastic melt to the warm or hot petroleum feedstock while thoroughly mixing. Alternatively, it is prepared by heating the petroleum only to the temperature above the melting point of the plastic and then adding solid plastic slowly to the hot petroleum liquid while thoroughly mixing the mixture and maintaining the temperature above the melting point of the plastic.

Referring to FIG. 2 of the Drawings, a stepwise preparation process of preparing the hot homogeneous liquid blend is shown. Mixed waste plastic is sorted to create postconsumer waste plastic 21 comprising polyethylene and/or polypropylene. The waste plastic is cleaned 22 and then mixed with an oil 24 in a hot blend preparation unit 23. After the mixing in 23, the homogeneous blend of the plastic and oil is recovered 25. Optionally a filtration device may be added (not shown) to remove any undissolved plastic particles or any solid impurities present in the hot liquid blend. The hot blend of the plastic and oil is then combined with the refinery feedstock, such as vacuum gas oil (VGO) 20, and becomes a mixture of the plastic/oil blend and VGO, 26, which can then be passed to a refinery unit.

FIG. 3 illustrates a method for preparing a stable blend of plastic and oil. The stable blend is made in a stable blend preparation unit by a two-step process. The first step produces a hot, homogeneous liquid blend of plastic melt and petroleum feedstock, the step is identical to the hot blend preparation described in FIG. 2. The preferred range of the plastic composition in the blend is about 1-20 wt. %. If high molecular weight polypropylene (average molecular weight of 250,000 or greater) waste plastic or high-density polyethylene (density above 0.93 g/cc) is used as the predominant waste plastic, e.g., at least 50 wt. %, then the amount of waste plastic used in the blend is more preferably about 10 wt. %. The reason being that the pour point and viscosity of the blend would be high.

The preferred conditions for the hot homogeneous liquid blend preparation include heating the plastic above the melting point of the plastic while vigorously mixing with a petroleum feedstock. The preferred process conditions include heating to a 250-500° F. temperature, with a residence time of 5-240 minutes at the final heating temperature, and 0-10 psig atmospheric pressure. This can be done in an open atmosphere as well as under an oxygen-free inert atmosphere.

In the second step, the hot blend is cooled down below the melting point of the plastic while continuously vigorously mixing with petroleum feedstock, and then further cooling to a lower temperature, preferably ambient temperature, to produce a stable blend of the plastic and oil.

It has been found that the stable blend is an intimate physical mixture of plastic and petroleum feedstock. The plastic is in a "de-agglomerated" state. The plastic maintains a finely dispersed state of solid particles in the petroleum feedstock at temperatures below the melting point of the plastic, and particularly at ambient temperatures. The blend is stable and allows easy storage and transportation. At a refinery, the stable blend can be heated in a preheater above the melting point of the plastic to produce a hot, homogenous liquid blend of the plastic and petroleum. The hot liquid blend can then be fed to a refinery unit as a cofeed with conventional refinery feed.

In FIG. 3, further details of the stable blend preparation are shown. The stable blend is made in a stable blend preparation unit 100 by a two-step process. As shown, clean waste 22 is passed to the stable blend preparation unit 100. The selected plastic waste 22 is heated and mixed with a refinery feedstock oil 24. The plastic waste is heated above the melting point of the plastic to melt the plastic. The petroleum feedstock is mixed with the heated plastic at 23. The mixing is often quite vigorous. The mixing and heating conditions can generally comprise heating at a temperature in the range of about 250-500° F., with a residence time of 5-240 minutes at the final heating temperature. The heating and mixing can be done in the open atmosphere or under an oxygen-free inert atmosphere. The result is a hot, homogenous liquid blend of plastic and oil 25. Optionally a filtration device may be added (not shown) to remove any undissolved plastic particles or any solid impurities present in the hot homogeneous liquid blend.

The hot blend 25 is then cooled below the melting point of the plastic while continuing the mixing of the plastic with the petroleum oil feedstock 101. Cooling generally continues, usually to an ambient temperature, to produce a stable blend of the plastic and oil 102. At a refinery, the stable blend can be fed to a preheater, 29, which heats the blend above the melting point of the plastic to produce a mixture of plastic/oil blend and VGO, 26, which is then fed to a refinery conversion unit.

Figure 4:
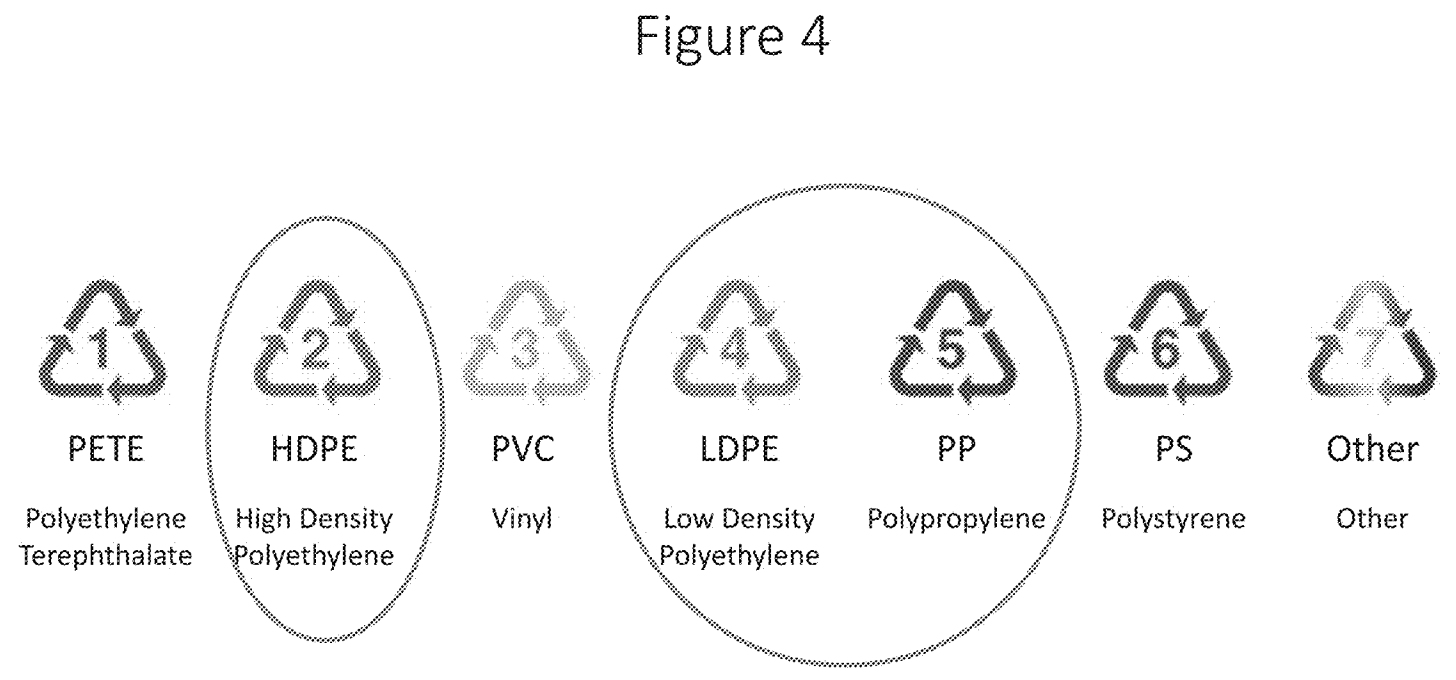

The preferred plastic starting material for use in the present blend is sorted waste plastics containing predominantly polyethylene and polypropylene (plastics recycle classification types 2, 4, and 5). The pre-sorted waste plastics are washed and shredded or pelleted to feed to a blend preparation unit. FIG. 4 depicts the plastic type classification for waste plastics recycling. Classification types 2, 4, and 5 are high density polyethylene, low density polyethylene and polypropylene, respectively. Any combination of the polyethylene and polypropylene waste plastics can be used. Polystyrene, classification 6, can also be present in a limited amount.

Proper sorting of waste plastics is very important in order to minimize contaminants such as N, Cl, and S. Plastics waste containing polyethylene terephthalate (plastics recycle classification type 1), polyvinyl chloride (plastics recycle classification type 3) and other polymers (plastics recycle classification type 7) need to be sorted out to less than 5%, preferably less than 1% and most preferably less than 0.1%. The present process can tolerate a moderate amount of polystyrene (plastics recycle classification type 6). Waste polystyrene needs to be sorted out to less than 20%, preferably less than 10% and most preferably less than 5%.

Washing of waste plastics can remove metal contaminants such as sodium, calcium, magnesium, aluminum, and non-metal contaminants coming from other waste sources. Non-metal contaminants include contaminants coming from the Periodic Table Group IV, such as silica, contaminants from Group V, such as phosphorus and nitrogen compounds, contaminants from Group VI, such as sulfur compounds, and halide contaminants from Group VII, such as fluoride, chloride, and iodide. The residual metals, non-metal contaminants, and halides need to be removed to less than 50 ppm, preferentially less than 30 ppm and most preferentially to less than 5 ppm.

The petroleum with which the waste plastic is blended is generally a petroleum feedstock for the refinery. It is preferred that the petroleum blending oil is the same as the petroleum feedstock for the refinery. The petroleum can also comprise any petroleum derived oil or petroleum based material. In one embodiment, the petroleum feedstock oil can comprise atmospheric gas oil, vacuum gas oil (VGO), atmospheric residue, or heavy stocks recovered from other refinery operations. In one embodiment, the petroleum feedstock oil with which the waste plastic is blended comprises VGO. In one embodiment, the petroleum feedstock oil with which the waste plastic is blended comprises light cycle oil (LCO), heavy cycle oil (HCO), FCC naphtha, gasoline, diesel, toluene, and/or an aromatic solvent derived from petroleum.

In one embodiment, the petroleum feedstocks for the blend preparation include vacuum gas oil, atmospheric gas oil, reformate, light cycle oil, heavy fuel oil, refinery hydrocarbon streams containing toluene, xylene, heptane or benzene, or pure toluene, pure xylene, coker naphtha, C5-C6 isomerized paraffinic naphtha, FCC naphtha, hydrocracker bottom, gasoline, jet fuel, diesel or mixtures of some these.

The most preferred petroleum feedstocks are gas oil, heavy reformate, or various recycle streams that will be fed to a catalytic conversion unit. Then, the plastic and petroleum feedstock in the blend are converted together to a higher value product via catalytic conversion.

More than one petroleum feedstock can be used to optimize the blend properties. For example, the viscosity and pour point can be lowered by adding lighter petroleum feedstocks such as light cycle oil, gasoline, or diesel.

Optionally, solvents such as benzene, toluene, xylene or heptane may be added to the blend to reduce the viscosity or pour point of the blend of plastic and petroleum feedstock for easier handling.

While not wanting to be bound by a theory, the present process prepares a stable blend that is an intimate physical mixture of plastic and petroleum feedstock for catalytic conversion in refinery units. The present process produces a stable blend of petroleum feedstock and plastic wherein the plastic is in a "de-agglomerated" state. The plastic maintains its state as "finely dispersed" solid particles in the petroleum feedstock at ambient temperature. This blend is stable and allows easy storage and transportation. At a refinery, the stable blend can be preheated above the melting point of the plastic to produce a hot, homogeneous liquid blend of plastic and petroleum, and then the hot liquid blend is fed to a conversion unit. Then both the petroleum feed and plastic are simultaneously converted in the conversion unit, such as fluid catalytic cracking (FCC) or hydrocracking (HCR) unit, with typical refinery catalysts containing zeolite(s) and other active components such as silica-alumina, alumina and clay.

The following examples are provided to further illustrate the present process and its benefits. The examples are meant to be illustrative and not limiting.

Example 1: Properties of Virgin Plastic Samples and Petroleum Feedstock Used for Blend Preparations Four commercial plastic samples, low density polyethylene (LDPE, Plastic A), high density polyethylene (HDPE, Plastic B), two polypropylene samples with average molecular weight of ~12,000 (PP, Plastic C) and ~250,000 (PP, Plastic D), were purchased and their properties are summarized in Table 1.

TABLE 1

| Properties of Virgin Plastics Used | | | | |
| --- | --- | --- | --- | --- |
| | LDPE (Plastic A) | HDPE (Plastic B) | PP (Plastic C) | PP (Plastic D) |
| Form | Pellets | Pellets | Pellets | Pellets |
| Melt Index | 25 g/10 min (190° C./2.16 kg) | 12 g/10 min (190° C./2.16 kg) | — | 12 g/10 min (230° C./2.16 kg) |
| Melting Point, ° C. | 116 | 125-140 | 157 | 160-165 |
| Transition Temp, ° C. | 93, softening | 125, softening | 163, softening | — |
| Density, g/mL at 25° C. | 0.925 | 0.952 | 0.9 | 0.9 |
| Hardness | — | 66 | — | 100 |
| Average molecular weight, $M_w$ | — | — | ~12,000 | ~250,000 |
| Average molecular weight, $M_n$ | — | — | ~5,000 | ~67,000 |

Petroleum feedstocks used to prepare the stable blends with plastic includes hydrotreated vacuum gas oil (VGO), Aromatic 100 solvent, light cycle oil (LCO), and diesel. Their properties are shown in Table 2 below. Aromatic 100 is a commercially available aromatic solvent manufactured from petroleum-based material, and mainly contains C9-C10 dialkyl and trialkyl benzenes.

TABLE 2

| Properties of Petroleum Feedstocks for Blend Preparations | | | | |
| --- | --- | --- | --- | --- |
| | Hydrotreated VGO Petroleum Feed #1 | Aromatic 100 Petroleum Feed #2 | LCO Petroleum Feed #3 | Diesel Petroleum Feed #4 |
| Specific Gravity | 0.897 | 0.872 | 0.956 | 0.811 |
| Carbon, wt % | 87.84 | 89.90 | 90.50 | 86.4 |
| Hydrogen, wt % | 12.69 | 10.10 | 9.50 | 14.6 |
| H/C Molar Ratio | 1.73 | 1.33 | 1.26 | 2.0 |
| Bromine Number | 2 | — | — | 0.1 |
| Total S, ppm | 150 | 0 | 900 | <2 |
| Total N, ppm | 273 | 0 | N/A | <0.1 |
| Ni, ppm | <0.6 | 0 | <0.2 | <0.2 |
| V, ppm | <0.6 | 0 | <0.2 | <0.2 |
| Simdist, ° F. IBP (0.5%) | 462 | 297 | 235 | 536 |
| 5 wt % | 573 | 325 | 405 | 553 |
| 10 wt % | 616 | 327 | 441 | 563 |
| 30 wt % | 706 | 330 | 490 | 601 |
| 50 wt % | 775 | 336 | 541 | 638 |
| 70 wt % | 854 | 344 | 607 | 673 |
| 90 wt % | 962 | 355 | 689 | 702 |
| 95 wt % | 1008 | 362 | 718 | 709 |
| FBP (99.5%) | 1107 | 376 | 786 | 717 |

Figure 5:
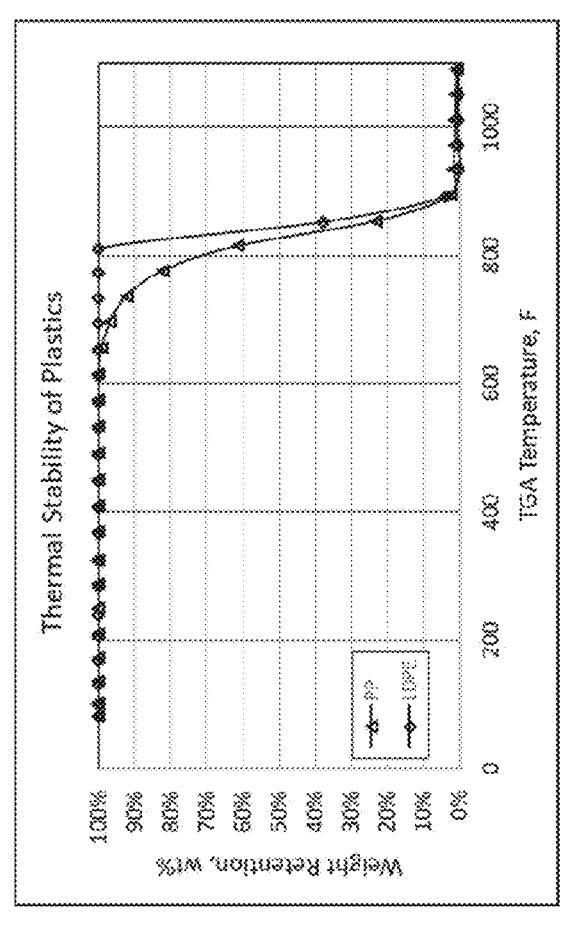
FIG. 5 graphically shows Thermal Gravimetric Analysis (TGA) results for low density polyethylene and a polypropylene polymer.

Thermal Gravimetric Analysis (TGA) was conducted with Plastic A (LDPE) and Plastic C (Polypropylene) to verify the plastic materials are thermally stable well above the blend preparation temperature for dissolution of plastic. TGA results shown in FIG. 5 indicate the LPDE sample is stable up to 800° F. and the polypropylene sample up to 700° F.

Example 2—Preparation of Stable Blends of VGO and Virgin Plastic

Several blends of VGO and the plastic were prepared by adding the plastic pellets (Plastic A through D of Table 1) to a hydrotreated vacuum gas oil (Petroleum Feed #1 of Table 2).

The following procedure was used. At ambient temperature, the VGO feed (waxy solids) was added to a beaker. The VGO was heated with a heating mantle while stirring with a magnetic stirrer. The VGO temperature was increased gradually to 275-400° F., and then pre-weighed plastic pellets (solids) were slowly added to the hot VGO while stirring and heating. After the plastic pellets had dissolved, the stirred solution was then held at the final temperature for 30 additional minutes for blends with LDPE and Plastic C polypropylene, or for 60 minutes for blends with HDPE and Plastic D polypropylene. Visual observation indicated the blends were completely homogeneous. Upon cooling to ambient temperature, the blend of the plastic and VGO showed the visual appearance of the waxy solid of the VGO, but the hardening temperature (or solidification temperature or pour point) were different from the starting VGO.

To assess material handling need, a pour point (per ASTM D5950-14) and viscosity (per ASTM D445) of the blends were measured. Material stability was observed by visual observation. The blend of plastic melt and VGO was stable, and no change was observed for a 3-month period of observation. Table 3 below summarizes the list of samples prepared and their properties.

TABLE 3

Preparation for Stable Blends of Plastic and VGO

| Example | Wt % Plastic in the Blend | Pour Point ° C. | Viscosity at 180° C. | Storage Stability |
|---|---|---|---|---|
| Example 2-1 | None (base case) | 25 | 1.8 | Stable |
| Example 2-2 | 5 wt % LDPE (Plastic A) | 27 | 9.8 | Stable |
| Example 2-3 | 10 wt % LDPE (Plastic A) | 25 | 33.0 | Stable |
| Example 2-4 | 20 wt % LDPE (Plastic A) | 93 | — | Stable |
| Example 2-5 | 5 wt % HDPE (Plastic B) | 103 | — | Stable |
| Example 2-6 | 10 wt % HDPE (Plastic B) | 105 | — | Stable |
| Example 2-7 | 20 wt % HDPE (Plastic B) | 123 | — | Stable |
| Example 2-8 | 5 wt % PP (Plastic C) | 34 | 3.3 | Stable |
| Example 2-9 | 10 wt % PP (Plastic C) | 37 | 5.3 | Stable |
| Example 2-10 | 20 wt % PP (Plastic C) | 30 | — | Stable |
| Example 2-11 | 5 wt % PP (Plastic D) | 36 | — | Stable |
| Example 2-12 | 10 wt % PP (Plastic D) | >150 | — | Stable |

Example 3—Preparation of Stable Blends of Aromatic Solvent and Plastic

Several blends of an aromatic solvent and the four plastic samples were prepared by adding the plastic pellets to an aromatic solvent (Petroleum Feed #2 of Table 2).

The procedure described in Example 2 was used for these blend preparations except the solvent temperature was 250° F. before the plastic was added, the final hold time was 60 minutes. The characteristics of the blends are shown below in Table 4.

TABLE 4

Preparation for Stable Blends of Plastic and Aromatic Solvent

| Example | Wt % Plastic in the Blend | Pour Point ° C. | Storage Stability |
|---|---|---|---|
| Example 3-1 | 20 wt % LDPE (Plastic A) | 68 | Stable |
| Example 3-2 | 10 wt % HDPE (Plastic B) | — | Stable |
| Example 3-3 | 20 wt % PP (Plastic C) | 74 | Stable |
| Example 3-4 | 10 wt % PP (Plastic D) | 81 | Stable |

Example 4—Preparation of VGO and Virgin Plastic Blends

Several blends of vacuum gas oil (VGO) and the two plastic samples (Plastic A and C from Table 1) were prepared by adding the plastic pellets to a hydrotreated vacuum gas oil (Petroleum Feed #1 of Table 2) using an autoclave.

The following procedure was used. At ambient temperature, pre-weighed plastic pellets (solids) and the VGO feed (waxy solids) were added to a batch autoclave unit. The autoclave was purged with N2 gas to remove air in the vessel, and then the inlet and outlet valves were closed. The mixture was stirred with an impeller at 1600 RPM while the mixture was heated with an external heating jacket to the target temperature of 177° C. (350° F.) or 232° C. (450° F.) by raising the temperature set point by 10° C. for every 10 minutes. Then, the temperature was held at the target temperature for 2 hours, then cooled down to ambient temperature with the stirring maintained. The pressure was monitored for the entire time. Typically, the pressure was built up to as high as 8 psig at 450° F., and then back to 1 psig upon cooling, indicating no reaction between plastic and VGO. The slight pressure build-up near the target heating temperature was due to vaporization of light material in VGO.

The blend product at ambient temperature showed no visible plastic residue and was completely homogeneous per visual observation. The blend of the plastic and VGO showed the look of VGO's waxy solids. The blend of plastic and VGO was stable, and no change was observed for a 3-month period of observation.

To assess material handling need, a pour point (per ASTM D5950-14) and viscosity (per ASTM D445) of the blend were measured. In addition, a content of hot heptane insoluble material was measured per ASTM D3279 procedure. The hot heptane insoluble method determines the weight percent of material in oils that is insoluble in hot heptane at 80° C. The method isolates the insoluble material using 0.8-micron membrane filter. The heptane insoluble content provides information on non-dissolved plastic in the blend. Table 5 below summarizes the list of samples prepared and their properties.

TABLE 5

Preparation for Stable Blend of Plastic and VGO

| Example | Wt % Plastic Melt | Prep Temp, ° C. | Pour Point, ° C. | Viscosity at 180° C. | Heptane Insoluble, wt % |
|---|---|---|---|---|---|
| Example 2-1 | None | — | 25 | 1.81 | 0.01 |
| Example 4-1 | 10 wt % LDPE (Plastic A) | 177 | 25 | 31.8 | 9.9 |
| Example 4-2 | 10 wt % LDPE (Plastic A) | 232 | 20 | 31.4 | 9.4 |
| Example 4-3 | 20 wt % LDPE (Plastic A) | 232 | 80 | 239 | 19.5 |
| Example 4-4 | 10 wt % PP (Plastic C) | 177 | 33 | 5.58 | 8.1 |
| Example 4-5 | 10 wt % PP (Plastic C) | 232 | 37 | 5.58 | 7.9 |
| Example 4-6 | 20 wt % PP (Plastic C) | 232 | ~40 | 14.2 | 16.1 |

The pour point and viscosity values are used to guide equipment selection and operating procedure. The blends made with addition of plastic show moderate increases of pour point and viscosity compared with the pure VGO base case. These changes can be handled with typical refinery operating equipment with minor or no modifications. The blend tank will be heated above the pour point to change the physical state of the blend into an easily transferable liquid. Then, the liquid blend can be transferred to a transportation vessel or to a refinery unit via pumping with a pump or via draining using gravity force or via transferring using a pressure differential.

The stable blends stay as physical mixtures at temperature up to 80° C. It was possible to separate the plastic from the blend using the hot heptane insoluble test. At 80° C., all the wax in VGO was dissolved in the heptane solvent (Example 2-1 in Table 5). The weight percent of heptane insoluble material is coming from undissolved plastic that was filtered out with the 0.8-micron membrane filter. The amounts of recovered as solid material match well with the amounts of plastic we added to the blend preparations. The heptane insoluble results in Table 5 clearly indicated that the plastic is a physical mixture of solid particles dispersed in VGO in the blend at 80° C. and that the bulk of plastic particles can be separated effectively with the 0.8-micron filter. Optical light microscope analyses indicate the plastic is in finely dispersed microcrystalline particles with the particle size of around 10 micron to 80 micron (shown in Example 5).

Figure 6:
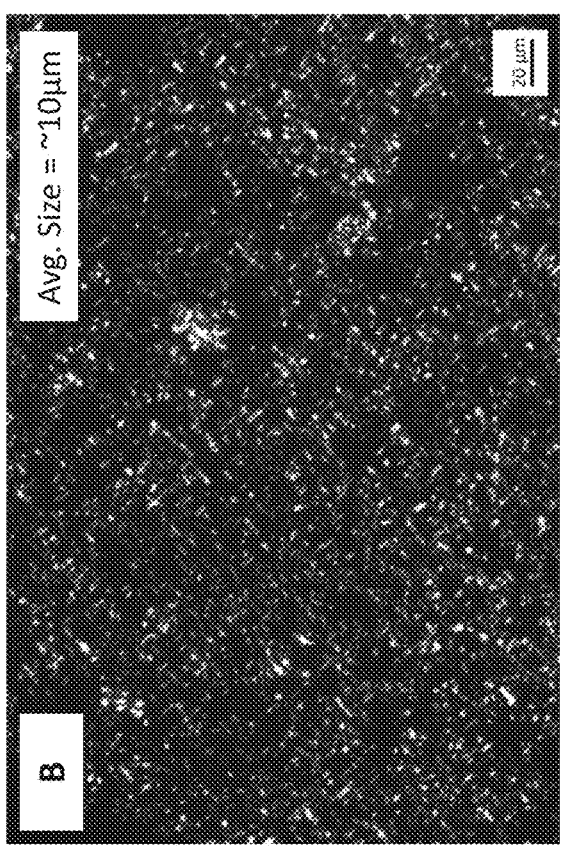
FIG. 6 shows the optical light microscope examination of polyethylene prepared blends in bright field mode (A) and cross polarized light mode (B).
Figure 6:
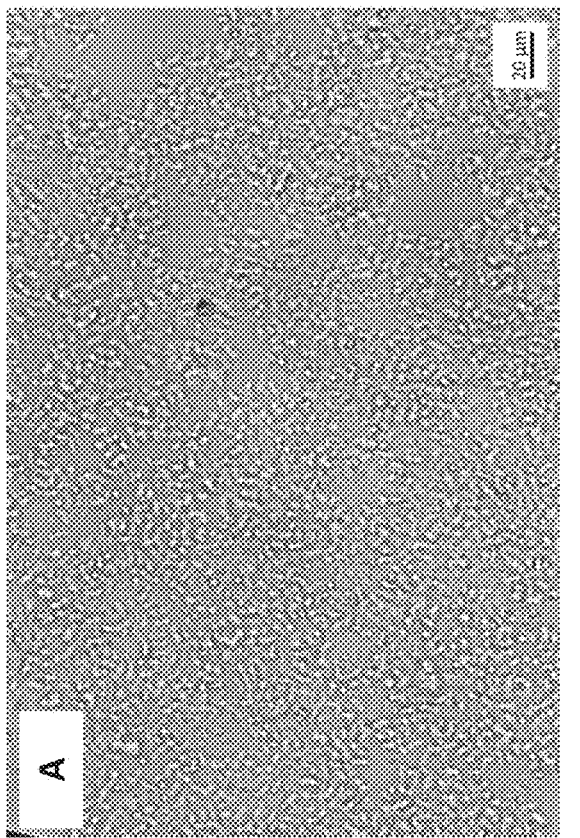

Example 5A—Optical Microscope Examination of Stable Blend with Low Density Polyethylene FIG. 6 shows an optical light microscope view of an as-prepared blend (Example 4-1) of polyethylene (Plastic A) and VGO at ambient temperature in bright field mode (A) and cross polarized light mode (B). At ambient temperature, the blend was a physical mixture of finely dispersed plastic particles and petroleum. The average particle size of the polyethylene particles was 10 microns. The fine micron-size polyethylene is uniformly distributed in the VGO, and they have the visual appearance of micelles.

Figure 7:
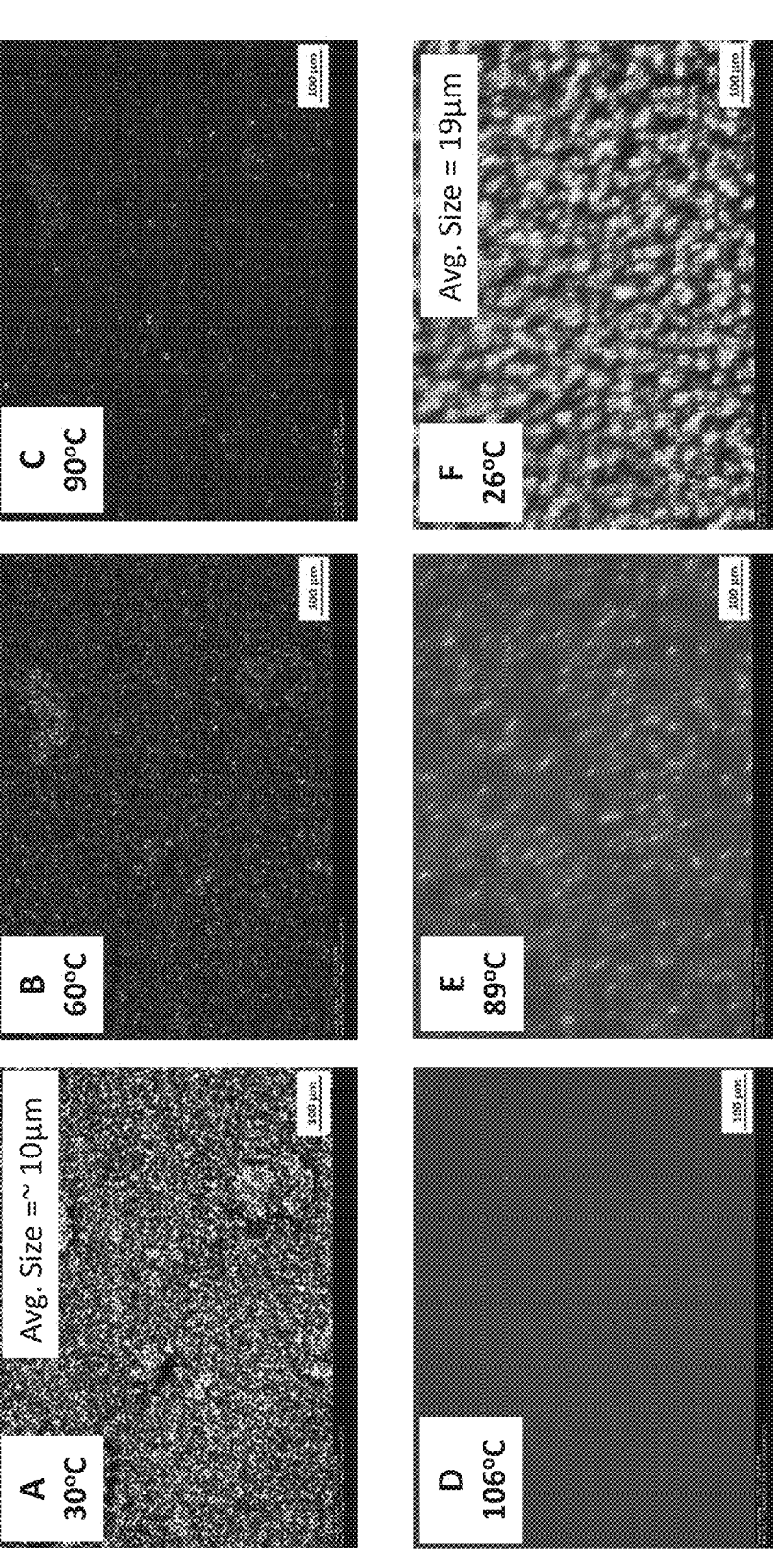
FIG. 7 shows optical light microscope examination of a polyethylene prepared blend in cross polarized light mode at various temperatures during heating and cooling.

FIG. 7 shows an optical light microscope (OLM) view of an as-prepared blend (Example 4-1) of polyethylene (Plastic A) and VGO in cross polarized light mode at various temperatures during heating and cooling. At the ambient temperature, the polyethylene stays as microcrystalline particles with a 10-micron average particle size (FIGS. 6 and 7A). Upon heating to 90° C., most of the polyethylene is melted, and at 106° C. all polyethylene is completely melted and formed a uniform hot liquid blend with VGO. Upon cooling, polyethylene started to recrystallize at around 90° C., and becomes crystalline particles again at 25° C. ambient temperature (FIG. 7F). The recrystallized plastic shown in FIG. 7F exhibits a larger average particle size of about 19 microns, compared with the plastic particles in the as-prepared blend shown in FIG. 7A, likely due to the fact that the blend cooled on the OLM stage without stirring of the plastic/VGO blend. The results suggest that if the blend is cooled without stirring, the blend may contain plastic particles with a larger particle size. This finding implies that continuous, vigorous stirring during the cooling step is desirable to produce a stable blend of petroleum and micron-size plastic particles.

Figure 8:
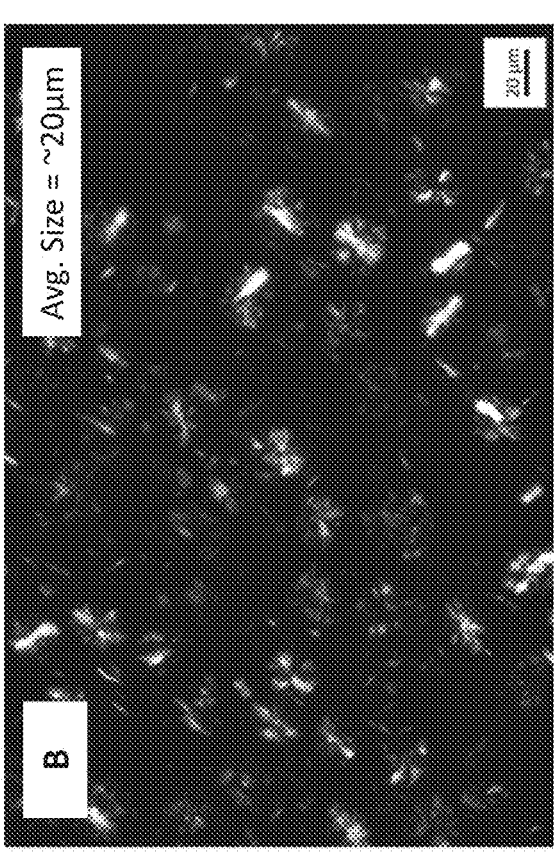
FIG. 8 shows the optical light microscope examination of polypropylene prepared blends in bright field mode (A) and cross polarized light mode (B).
Figure 8:
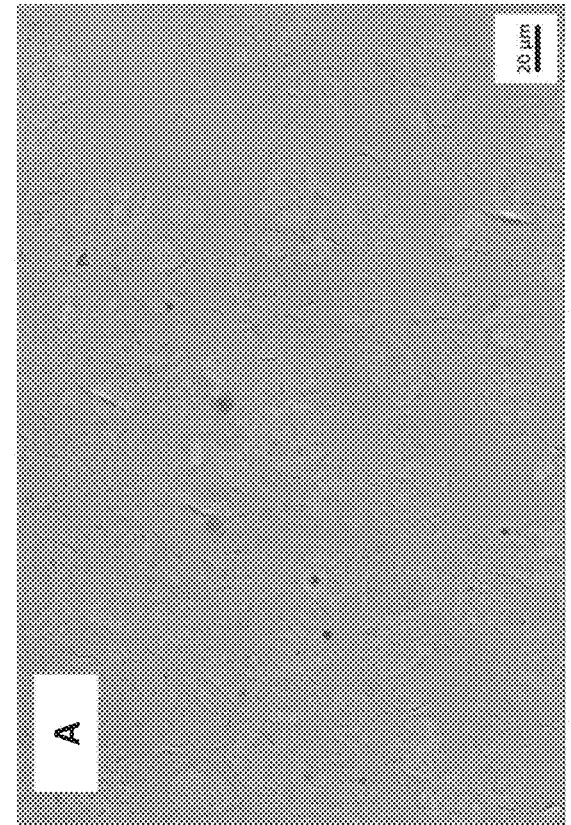

Example 5B—Optical Microscope Examination of Stable Blend with Polypropylene FIG. 8 shows an optical light microscope view of an as-prepared blend of polypropylene (Plastic C) and VGO (Example 4-4) at ambient temperature in bright field mode (A) and cross polarized light mode (B). The average particle size of the polypropylene was about 20 microns. The fine microcrystalline polypropylene was uniformly distributed in the VGO, and they have the visual appearance of micelles.

Figure 9:
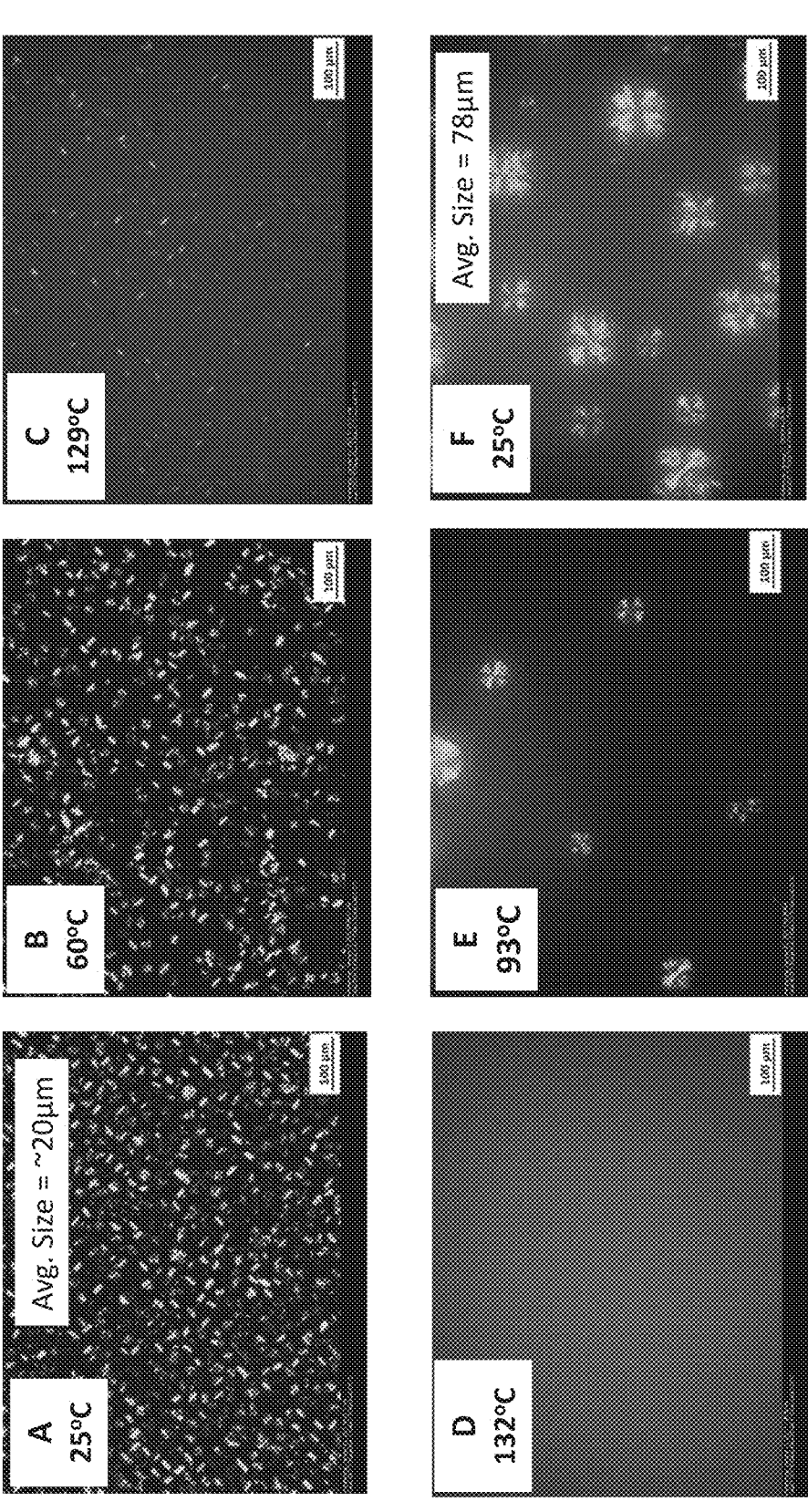
FIG. 9 shows optical light microscope examination of a polypropylene prepared blend in cross polarized light mode at various temperatures during heating and cooling.

FIG. 9 shows an optical light microscope (OLM) view of an as-prepared blend (Example 4-4) of polypropylene (Plastic C) and VGO in cross polarized light mode at various temperatures during heating and cooling. At ambient temperature, the polypropylene stays as microcrystalline particles with 20-micron average particle size (FIGS. 8 and 9A). Upon heating to 129° C., most of the polyethylene is melted, and at 132° C. all polypropylene is completely melted and formed a uniform hot liquid blend. Upon cooling, polypropylene started to recrystallize at around 93° C., and became crystalline particles again at ambient temperature. The recrystallized particles have a larger average particle size of about 78 microns, because the blend was cooled on the OLM stage without stirring with VGO. Again, the recrystallized plastic shown in FIG. 9F exhibits have a much larger average particle size compared with the plastic particles in the as-prepared blend shown in FIG. 9A. This finding implies that continuous, vigorous stirring during the cooling step is desirable to produce a stable blend of petroleum and microcrystalline plastic particles.

Example 6—Preparation of VGO and Plastic Blends with HDPE and Higher Molecular Weight Polypropylene Two blends of vacuum gas oil (VGO) with plastic (Plastic B and D each of Table 1) were prepared using an autoclave. This VGO is similar to Petroleum Feed #1 but has a higher pour point. The procedure described in Example 4 was used for these blend preparations except that the heating temperature was 232° C. (450° F.) and the holding time at 450° F. was 4 hours. As produced blends were solid at the ambient temperature with a look of VGO wax. Table 6 shows the characteristics of the blends.

TABLE 6

| | | | | |
|---|---|---|---|---|
| | Preparation for Stable Blend of Plastic and VGO | | | |
| Example | Wt % Plastic Melt | Pour Point, ° C. | Viscosity at 180° C. | Heptane Insoluble, wt % |
| Example 6-1 | None | 36 | 1.67 | 0.01 |
| Example 6-2 | 10 wt % HDPE (Plastic B) | 101 | 212 | 10.4 |
| Example 6-3 | 10 wt % PP (Plastic D) | 109 | 132 | 9.8 |

Example 7—Viscosity Improvement of Stable Blend with Light Petroleum Addition This example shows that adding light cycle oil (LCO, Petroleum Feed #3) or diesel (Petroleum Feed #4) reduces the viscosity substantially for easier handling of the feedstock.

Example 7-1 was prepared by adding 20 wt. % of light cycle oil to Example 6-2 (a blend of 10 wt % HDPE Plastic B in VGO). A procedure similar to the procedure described in Example 4 was used for this blend preparation. The mixture was heated to 350° F., held at the temperature for one hour, and then cooled down to ambient temperature while stirring for the entire time. The pressure was monitored during heating. The pressure was built up to as high as 4 psig at 350° F., and then back to 0 psig upon cooling, indicating no reaction between plastic, VGO and LCO. The slight pressure build-up near the target temperature was due to vaporization of light material in LGO.

Example 7-2 was prepared via a comparable method to Example 7-1 except that diesel was used instead of LCO.

The final products, Examples 7-1 and 7-2, were waxy looking, light brown solids at ambient temperature, which looked homogeneous per visual observation and did not contain any visible plastic residue. The blend of plastic, LCO (or diesel) and VGO was stable, and no change was observed for a 2-week period of observation. Table 7 below summarizes the list of samples prepared and their properties.

TABLE 7

Preparation of Stable Blend of Plastic, VGO and Second Petroleum Feed Use of Light Petroleum Second Feed for Physical Property Improvement

| Example | Plastic and Petroleum Blend Description | Pour Point, ° C. | Viscosity at 180° C. |
|---|---|---|---|
| Example 6-2 | 10 wt % HDPE (Plastic B) | 101 | 212 |
| Example 7-1 | 20 wt % addition of LCO to Example 6-2 | 100 | 89 |
| Example 7-2 | 20 wt % addition of Diesel to Example 6-2 | 96 | 105 |

Example 8—Direct Conversion of Plastic and VGO Via FCC Using USY Catalysts

To study the impact of processing of waste plastics and vacuum gas oil in a refinery FCC unit, laboratory tests of fluidized catalytic cracking (FCC) process were carried out with stable blends of plastic and VGO (Examples 2-3, 2-9, 2-10) using an FCC catalyst containing USY zeolite. The catalyst was an equilibrium catalyst removed from a commercial FCC plant.

The FCC experiments were carried out on a Model C ACE (advanced cracking evaluation) unit fabricated by Kayser Technology Inc. using regenerated equilibrium catalyst (Ecat) from a refinery. The reactor was a fixed fluidized reactor using N2 as fluidization gas. Catalytic cracking experiments were carried out at the atmospheric pressure and 975° F. reactor temperature. The cat/oil ratio was varied between 5 to 8 by varying the amount of the catalyst. A gas product was collected and analyzed using a refinery gas analyzer (RGA), equipped with GC with FID detector. In-situ regeneration of a spent catalyst was carried out in the presence of air at 1300° F., and the regeneration flue gas was passed through an IR cell to determine the flue gas composition which is used to calculate coke yield. A liquid product was weighted and analyzed in a GC for simulated distillation (D2887) and C5-composition analysis. With a material balance, the yields of coke, dry gas components, LPG components, gasoline (C5-430° F.), light cycle oil (LCO, 430-650° F.) and heavy cycle oil (HCO, 650° F.+) were determined. The results are summarized below in Table 8.

TABLE 8

Evaluation of Plastic Cofeeding to FCC with USY Catalyst

| Example # | Example 8-1 | Example 8-2 | Example 8-3 | Example 8-4 |
|---|---|---|---|---|
| Feed | 100% VGO Feed | 5/95 wt % Blend | 10/90 wt % Blend | 5/95 wt % Blend PP/VGO |

TABLE 8-continued

Evaluation of Plastic Cofeeding to FCC with USY Catalyst

| Example # | Example 8-1 | Example 8-2 | Example 8-3 | Example 8-4 |
|---|---|---|---|---|
| | Example 2-1 | LDPE/VGO Example 2-2 | LDPE/VGO Example 2-3 | Example 2-8 |
| Temperature (° F.) | 975 | 975 | 975 | 975 |
| Cat/Oil, wt/wt | 6.0 | 6.0 | 6.0 | 6.0 |
| Conversion, wt %* | 79.8 | 81.6 | 81.2 | 80.5 |
| Yields, wt % | | | | |
| Coke | 4.58 | 5.19 | 5.65 | 4.99 |
| Total Dry Gas | 2.06 | 2.14 | 2.00 | 2.10 |
| Hydrogen | 0.12 | 0.13 | 0.10 | 0.13 |
| Methane | 0.66 | 0.69 | 0.65 | 0.68 |
| Ethane | 0.45 | 0.46 | 0.43 | 0.46 |
| Ethylene | 0.78 | 0.81 | 0.76 | 0.78 |
| Total LPG | 20.77 | 21.75 | 21.55 | 21.48 |
| Propane | 2.00 | 2.06 | 1.94 | 2.03 |
| Propylene | 5.06 | 5.24 | 5.33 | 5.20 |
| n-Butane | 1.66 | 1.70 | 1.65 | 1.67 |
| Isobutane | 6.92 | 7.30 | 7.10 | 7.21 |
| C4 Olefins | 5.13 | 5.45 | 5.52 | 5.36 |
| Gasoline (C5 - 430° F.) | 52.38 | 52.48 | 52.04 | 51.93 |
| LCO (430-650° F.) | 14.19 | 12.95 | 13.21 | 13.69 |
| HCO (650° F.+) | 6.02 | 5.49 | 5.56 | 5.81 |
| Gasoline Octane Number | | | | |
| RON-GC | 94.4 | 93.8 | 92.5 | 93.8 |
| MON-GC | 82.6 | 81.9 | 80.9 | 82.0 |
| (R + M)/2 | 88.5 | 87.9 | 86.7 | 87.9 |

*Conversion - conversion of 430° F.+ fraction to 430° F.−

**Octane number, (R + M)/2, was estimated from detailed hydrocarbon GC of FCC gasoline.

The results in Table 8 show that 5-10 wt. % cofeeding of plastic only makes very slight changes for the FCC unit performance indicating co-processing of plastic up to 10 wt. % is readily feasible. It is likely that up to 20% could be run without any performance issues, but appropriate equipment with good control is needed to handle the increased viscosity and pour point.

The plastic cracked more easily than VGO, thus the conversion increased slightly for the blends. The plastic added to the FCC feed led to a very slight increase of coke yields, but no significant change in dry gas yields. A moderate increase in LPG and $C_3$ and $C_4$ olefin yields, and a slight decreases in LCO and HCO yields were observed. The gasoline yields are similar. With the paraffinic nature of cracked products made from the plastic, the blends with plastic lowered the Octane number by about 1-2 numbers. With refinery operational flexibility, these octane number debits can be compensated with blending, or by adjusting FCC process operations and catalyst/additive formulations. The hydrocarbon compositions of all these cofeeding products are well within the typical FCC gasoline range.

Example 9: Properties of Waste Plastic Samples and Blend Preparations

Four waste plastic samples were purchased for blend preparations and their properties are summarized in Table 9. FT-IR was used to identify the general nature of the plastic. In addition to identification of the predominant polymer species, the FT-IR data also revealed that all these recycled plastic contained varying amounts of calcium carbonates and talc. To estimate the amount of potentially recoverable hydrocarbon, each sample was calcined under $N_2$ at 1000° F. for 3 hours. It was assumed that the recoverable hydrocarbon equals the % loss-on-ignition (LOI). The inorganic residue from the calcination was analyzed with ICP analysis. Using the LOI value and ICP analysis, wt % impurity in the as-received plastic was estimated and reported in Table 9 below. The most common impurities in waste plastic are Ca, Mg, Si and Ti that may come from plastic consumer product manufacturing as calcium carbonate, silica, and talc, which are commonly used filler material. Al, Fe, P, Zn are also present in substantial quantities.

TABLE 9

| | Properties of Waste Plastics | | | |
| | Waste Plastic #1 (Plastic E) | Waste Plastic #2 (Plastic F) | Waste Plastic #3 (Plastic G) | Waste Plastic #4 (Plastic H) |
| --- | --- | --- | --- | --- |
| Form | Pellets | Pellets | Pellets | Pellets |
| General Identification | PP, PE Mix | Polypropylene | PE, PP mix | PP, PE mix |
| LOI, wt % | 93.35 | 99.38 | 96.86 | 98.1 |
| Impurities, wt % | | | | |
| Al, wt % | 0.15 | — | 0.03 | 0.05 |
| Ca, wt % | 1.41 | — | 0.51 | 0.49 |
| Fe, wt % | 0.06 | — | 0.01 | 0.11 |
| Mg, wt % | 0.34 | — | 0.02 | 0.04 |
| P, wt % | 0.01 | — | 0 | 0 |
| Si, wt % | 0.82 | — | 0.06 | 0.12 |
| Ti, wt % | 0.24 | — | 1.0 | 0.52 |
| Zn, wt % | 0.01 | — | 0.01 | 0.01 |

Figure 10:
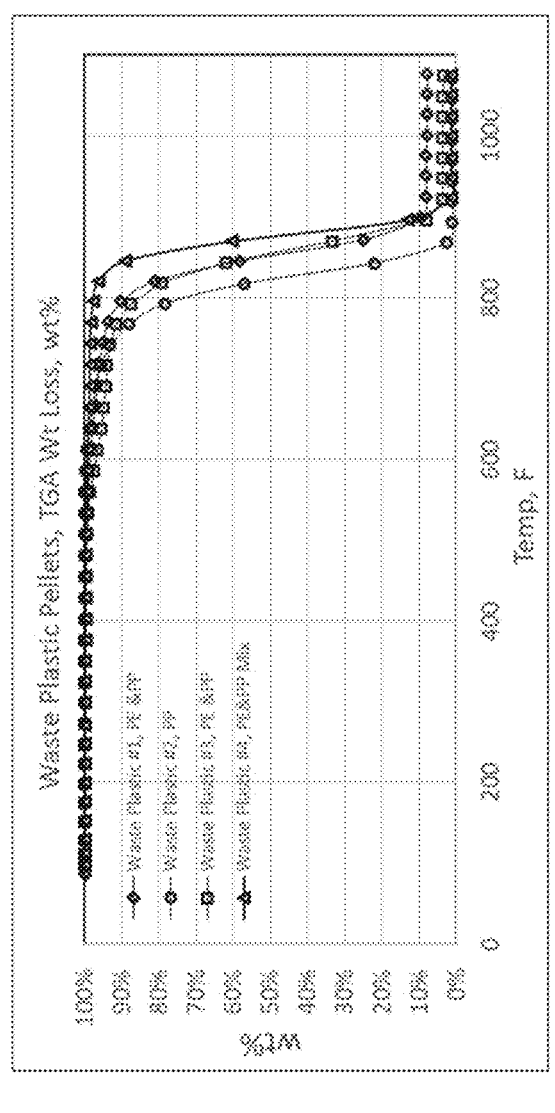
FIG. 10 graphically depicts a thermal gravimetric analysis (TGA) of the thermal stability of four waste plastic samples.

Thermal Gravimetric Analysis (TGA) was conducted with the waste plastic samples to verify the plastic materials are thermally stable well above the melt preparation temperature. TGA results shown in FIG. 10 indicate the waste plastic samples are stable up to 700° F.

Blends of waste plastic samples above and VGO were prepared using the procedure in Example 4, except the dissolution temperature was 400° F. After the dissolution of 10 wt % plastic, some solid precipitation was observed, likely coming from the filler material, and the blends generally exhibited very high viscosity, likely due to the presence of solids. For dissolution of 5 wt % plastic, the blends were filtered to remove the solid filler materials, whereby a significant drop in viscosities was observed.

TABLE 10

| | Preparation for Stable Blend of Waste Plastic and VGO | | | |
| Example | Wt % Plastic Melt | Prep Temp, ° C. | Pour Point, ° C. | Viscosity at 180° C. | Heptane Insoluble, wt % |
| --- | --- | --- | --- | --- | --- |
| Example 2-1 | None | — | 25 | 1.81 | 0.01 |
| Example 9-1 | 10 wt % Waste Plastic #1 | 204 | 97 | 344 | 9.6 |
| Example 9-2 | 5 wt % Waste Plastic #1 | 204 | 111 | — | 4.7 |
| Example 9-3 | 5 wt % Waste Plastic #2 | 204 | 33 | 13.4 | 5.6 |
| Example 9-4 | 10 wt % Waste Plastic #3 | 204 | 102 | 223 | 9.3 |
| Example 9-5 | 5 wt % Waste Plastic #3 | 204 | 96 | 32 | 4.2 |
| Example 9-6 | 10 wt % Waste Plastic #4 | 204 | 108 | 1081 | 9.6 |
| Example 9-7 | 5 wt % Waste Plastic #4 | 204 | 90 | 159 | 6.1 |

Example 10: Direct Conversion of Waste Plastic and VGO Blends Via FCC Using USY Catalysts To study the impact of processing waste plastics and vacuum gas oil in a refinery FCC unit, laboratory tests with a fluidized catalytic cracking (FCC) process were carried out with stable blends of waste plastic and VGO using an FCC catalyst containing USY zeolite. Plastics used were Waste Plastic #1 (Plastic E), and Waste Plastic #2 (Plastic F). A base case with only VGO feed (Example 10-1) was compared with two blend runs; comprised a 5/95% blend of Plastic E/VGO (Example 10-2) and a 5/95 wt. % blend of Plastic F/VGO (Example 10-3). The catalyst was an equilibrium catalyst removed from a commercial FCC plant.

TABLE 11

| | Evaluation of Waste Plastic Cofeeding to FCC with USY Catalyst | | |
| Example Number | Example 10-1 | Example 10-2 | Example 10-3 |
| --- | --- | --- | --- |
| Feed | Base Case 100% VGO Feed Base | Blend Feed #4 5/95 wt % Blend Waste Plastic #1/ VGO | Blend Feed #5 5/95 wt % Blend Waste Plastic #2/ VGO |
| Temperature (° F.) | 976 | 975 | 975 |
| Cat/Oil, wt/wt | 6 | 6 | 6 |
| Conversion, wt %* | 82.0 | 84.2 | 84.1 |
| Yields, wt % | | | |
| Coke | 4.90 | 6.00 | 6.03 |
| Total Dry Gas | 2.11 | 2.09 | 2.16 |
| Hydrogen | 0.13 | 0.11 | 0.13 |
| Methane | 0.69 | 0.69 | 0.71 |
| Ethane | 0.46 | 0.46 | 0.48 |
| Ethylene | 0.80 | 0.79 | 0.81 |
| Total LPG | 21.84 | 22.61 | 22.93 |
| Propane | 1.97 | 1.92 | 1.99 |
| Propylene | 5.51 | 5.73 | 5.79 |
| n-Butane | 1.73 | 1.72 | 1.77 |
| Isobutane | 7.02 | 7.16 | 7.32 |
| C4 Olefins | 5.61 | 6.08 | 6.05 |
| Gasoline (C5 - 430° F.) | 53.13 | 53.47 | 52.98 |
| LCO (430-650° F.) | 12.32 | 10.56 | 10.76 |
| HCO (650° F.+) | 5.69 | 5.28 | 5.14 |
| Gasoline Octane Number | | | |
| RON-GC | 94.94 | 93.41 | 93.86 |
| MON-GC | 83.70 | 82.41 | 82.78 |
| (R + M)/2 | 89.32 | 87.91 | 88.32 |

*Conversion - conversion of 430° F.⁺ fraction to 430° F.⁻

**Octane number, (R + M)/2, was estimated from detailed hydrocarbon GC of FCC gasoline.

The results in Table 11 show that 5 wt. % cofeeding of waste plastic makes only a slight change in the FCC unit performance, indicating co-processing of waste plastic at 5 wt. % is readily feasible.

The waste plastic cracked more easily than VGO, thus the conversion increased slightly for the blends. The waste plastic added to the FCC feed led to a very slight increase of coke yields, but little change in dry gas yields. A moderate increase in LPG, $C_3$ and $C_4$ olefin yields and a slight decrease in LCO and HCO yields were observed. The gasoline yields were similar. With the paraffinic nature of cracked products made from the plastic, the blends with plastic lowered the Octane number by about 1-1.5 numbers. With refinery operational flexibility, such octane number debits can be easily compensated with blending, or by adjusting FCC process operations and catalyst/additive formulations. The hydrocarbon compositions of all the cofeeding products are well within the typical FCC gasoline range.

As used in this disclosure the word "comprises" or "comprising" is intended as an open-ended transition meaning the inclusion of the named elements, but not necessarily excluding other unnamed elements. The phrase "consists essentially of" or "consisting essentially of" is intended to mean the exclusion of other elements of any essential significance to the composition. The phrase "consisting of" or "consists of" is intended as a transition meaning the exclusion of all but the recited elements with the exception of only minor traces of impurities.

All patents and publications referenced herein are hereby incorporated by reference to the extent not inconsistent herewith. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise that as specifically described without actually departing from the spirit and scope of the present invention as defined by the appended claims.

What is claimed is:

1. A blend of a petroleum feedstock and 1-20 wt. % of plastic, based on the weight of the blend, with the plastic comprising polyethylene and/or polypropylene, and the plastic in the blend comprising finely dispersed micron-size particles having an average particle size of 10 micron to less than 100 microns.

2. The blend of claim 1, wherein the amount of plastic in the blend comprises from 1-10 wt. % of the blend.

3. The blend of claim 1, wherein the plastic comprises low density polyethylene.

4. The blend of claim 1, wherein the plastic comprises high density polyethylene.

5. The blend of claim 4, wherein the blend comprises from 1-10 wt. % of the high density polyethylene.

6. The blend of claim 1, wherein the plastic comprises polypropylene having an average molecular weight, $M_w$, in the range of 5,000 to 150,000.

7. The blend of claim 1, wherein the plastic comprises polypropylene having an average molecular weight $M_w$, in the range of 150,000 to 400,000.

8. The blend of claim 7, wherein the blend comprises from 1-10 wt. % of the polypropylene.

9. The blend of claim 1, wherein the plastic comprises a mixture of polyethylene and polypropylene.

10. The blend of claim 1, wherein the plastic is a waste plastic mixture comprising polyethylene and polypropylene.

11. The blend of claim 1, wherein the finely dispersed particles have an average particle size in the range of 10-50 microns.

12. The blend of claim 1, wherein the petroleum feedstock in the blend comprises vacuum gas oil, atmospheric gas oil, reformate, light cycle oil, heavy fuel oil, refinery hydrocarbon streams containing toluene, xylene, heptane or benzene, coker naphtha, C5-C6 isomerized paraffinic naphtha, FCC naphtha, hydrocracker bottom, gasoline, jet fuel, diesel or mixtures thereof.

13. The blend of claim 1, wherein the petroleum feedstock in the blend comprises gas oil or heavy reformate.

14. The blend of claim 12, wherein the blend comprises light cycle oil, gasoline, or diesel.

15. The blend of claim 13, wherein the blend comprises light cycle oil, gasoline, or diesel.

16. The blend of claim 12, wherein the blend comprises benzene, toluene, xylene or heptane.

17. The blend of claim 13, wherein the blend comprises benzene, toluene, xylene or heptane.

18. A process for preparing a blend of plastic and petroleum comprising:

(a) mixing a petroleum feed and a plastic comprising polyethylene and/or polypropylene together and heating the mixture above the melting point of the plastic, but less than 500° F., while mixing; and (b) cooling the plastic melt and petroleum feedstock liquid blend to a temperature below the melting point of the plastic.

19. The process of claim 18, wherein the cooling in (b) is conducted together with continuous stirring.

20. The process of claim 18, wherein the heating is conducted within a temperature range of 250-450° F. with a residence time of 5-240 minutes at a final heating temperature.

21. The process of claim 18, wherein the cooling is continued until ambient temperature is reached.

22. The process of claim 18, wherein the plastic is waste plastic mixture comprises polyethylene and poly propylene.

* * * * *